(12) United States Patent
Asai

(10) Patent No.: US 9,741,319 B2
(45) Date of Patent: Aug. 22, 2017

(54) MEMORY CONTROL DEVICE, MOBILE TERMINAL, AND COMPUTER-READABLE RECORDING MEDIUM

(71) Applicant: Sharp Kabushiki Kaisha, Osaka-shi, Osaka (JP)

(72) Inventor: Junki Asai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 27 days.

(21) Appl. No.: 14/421,465

(22) PCT Filed: Aug. 28, 2013

(86) PCT No.: PCT/JP2013/073016
§ 371 (c)(1),
(2) Date: Feb. 13, 2015

(87) PCT Pub. No.: WO2014/038449
PCT Pub. Date: Mar. 13, 2014

(65) Prior Publication Data
US 2015/0206513 A1    Jul. 23, 2015

(30) Foreign Application Priority Data

Sep. 7, 2012  (JP) ................................ 2012-197792

(51) Int. Cl.
*G09G 5/393*    (2006.01)
*G06F 13/38*    (2006.01)

(52) U.S. Cl.
CPC .......... *G09G 5/393* (2013.01); *G06F 13/385* (2013.01); *G09G 2330/022* (2013.01); *G09G 2360/08* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | | |
|---|---|---|---|---|
| 4,717,950 A | * | 1/1988 | Wesolowski | H04N 9/896 348/498 |
| 5,473,148 A | * | 12/1995 | Tanaka | G06K 7/1486 235/454 |
| 5,517,253 A | * | 5/1996 | De Lange | G09G 5/14 348/513 |

(Continued)

FOREIGN PATENT DOCUMENTS

| | | |
|---|---|---|
| JP | 2005-124167 A | 5/2005 |
| JP | 2007-304832 A | 11/2007 |

(Continued)

OTHER PUBLICATIONS

Official Communication issued in International Patent Application No. PCT/JP2013/073016, mailed on Oct. 15, 2013.

*Primary Examiner* — Kee M Tung
*Assistant Examiner* — Xin Sheng
(74) *Attorney, Agent, or Firm* — Keating & Bennett, LLP

(57) ABSTRACT

In a case where a determination section (34) determines that a distance between rp and wp is less than RDIST, a period control section (33) carries out a suspending control of a reading operation of a next line, until the distance between rp and wp is not less than RDIST.

5 Claims, 6 Drawing Sheets

(56) References Cited

U.S. PATENT DOCUMENTS

| | | | |
|---|---|---|---|
| 6,054,980 A * | 4/2000 | Eglit | G09G 5/393 |
| | | | 345/204 |
| 2004/0135789 A1* | 7/2004 | Yu | G09G 5/399 |
| | | | 345/531 |
| 2005/0105001 A1 | 5/2005 | Yui et al. | |
| 2006/0034326 A1 | 2/2006 | Anderson et al. | |
| 2006/0161691 A1 | 7/2006 | Katibian et al. | |
| 2006/0164424 A1 | 7/2006 | Wiley et al. | |
| 2006/0168496 A1 | 7/2006 | Steele et al. | |
| 2006/0171414 A1 | 8/2006 | Katibian et al. | |
| 2006/0179164 A1 | 8/2006 | Katibian et al. | |
| 2006/0179384 A1 | 8/2006 | Wiley et al. | |
| 2006/0288133 A1 | 12/2006 | Katibian et al. | |
| 2008/0036631 A1 | 2/2008 | Musfeldt | |
| 2011/0219222 A1* | 9/2011 | Eichenberger | G06F 9/32 |
| | | | 712/241 |

FOREIGN PATENT DOCUMENTS

| | | |
|---|---|---|
| JP | 2011-041290 A | 2/2011 |
| JP | 2012-128589 A | 7/2012 |

* cited by examiner

MEMORY CONTROL DEVICE, MOBILE TERMINAL, AND COMPUTER-READABLE RECORDING MEDIUM

TECHNICAL FIELD

The present invention relates to a memory control device, a mobile terminal including the memory control device, a memory control program, and a computer-readable recording medium in which the memory control program is stored, each allowing writing, in a frame memory, data transferred from a host processor, and reading data written in the frame memory and transferring the read data to a display panel such as an LCD (Liquid Crystal Display).

BACKGROUND ART

In general, in a case where image data is transferred from a host processor (hereinafter merely referred to as "host") to a display panel such as an LCD, the image data is temporarily stored in a frame memory (hereinafter merely referred to as "memory") in an LCDC (LCD controller) and then output to the display panel. Consequently, when display data is not updated, it is unnecessary to transfer the image data from the host.

However, in a seamless process such as video image reproduction, input (writing) of image data from the host to the LCDC (frame buffer) and output (reading) of image data from the LCDC to the display panel are carried out substantially concurrently.

Consequently, in a case where a difference in transfer rate of image data between input and output cannot be compensated completely, so-called tearing occurs, which is an overtaking phenomenon of image data, in which phenomenon incomplete image data stored in a memory is output to a display panel. Furthermore, the output of incomplete image data to the display panel in the tearing causes flickers in image display.

An example of a prior art for preventing such tearing is a frame rate changing device disclosed in Patent Literature 1. The frame rate changing device includes memory control means for inputting/outputting data into/from a common memory, overtake prediction means for predicting a frame at which output of data from the memory overtakes input of data into the memory, and memory-writing control means for stopping writing of data into the memory when the overtake prediction means predicts that overtaking will occur.

Patent Literature 2 discloses a method for updating a buffer. This is a method for carrying timing information via a communication link between a first processor and a second processor. Furthermore, in this method, the communication link is in a halt mode, and a time event is scheduled in the first processor in order to carry the timing information to the second processor. Furthermore, in this method, link wakeup is started by the first processor when the time event is generated, the second processor detects the link wakeup, and the first processor and the second processor are synchronized with each other with respect to the carried timing information with use of detected link wakeup timing.

Patent Literature 3 discloses a memory accessing device. In the memory accessing device, when a writing process circuit determines that a writable region of the memory is not larger than a size of data to be written in the memory, a process of writing the data is stopped.

CITATION LIST

Patent Literatures

[Patent Literature 1]
    Japanese Patent Application Publication No. 2005-124167 (published on May 12, 2005)
[Patent Literature 2]
    Japanese Patent Application Publication No. 2011-41290 (published on Feb. 24, 2011)
[Patent Literature 3]
    Japanese Patent Application Publication No. 2007-304832 (published on Nov. 22, 2007)

SUMMARY OF INVENTION

Technical Problem

However, the techniques described in Patent Literatures 1-3 above have problems below.

For example, in these techniques, writing into a frame buffer for a single frame and reading from the frame buffer are made concurrently. Consequently, in a frame buffer for display, start of reading for display output cannot be stopped. This necessitates, as in the techniques described in the above documents,
(1) Wait for timing when no tearing is expected to occur and then start writing, or
(2) Giving up starting writing at timing when tearing is expected to occur.

For example, in the case (1), every time when a host updates image data for display, the host waits for safe timing, and in a worst case, there is a possibility that the host is required to wait for a time equal to one frame at maximum. This causes a problem that since a frame buffer of the host cannot be freed until data transfer for updating image data is completed, the host is required to wait before the host starts to generate image data after next, even if the host has a double buffer structure, resulting in drop frame. Furthermore, even when next image data is not updated, the host cannot stop its operation until image transfer is completed, and consequently power is consumed wastefully for a certain time.

The present invention is made in view of the foregoing conventional problems. An object of the present invention is to provide a memory control device etc. capable of avoiding drop frame, reducing wasteful power consumption, and preventing tearing.

Solution to Problem

In order to solve the foregoing problems, a memory control device in accordance with one aspect of the present invention is a memory control device which conducts (i) a writing operation in which data transferred from a host is written in a frame memory and (ii) a reading operation in which the data is read out from the frame memory so as to transfer the data to a display control section, the memory control device comprising: a determination section for determining, in a case where a readout period from start of the reading operation to end of the reading operation is shorter than a writing period from start of the writing operation to end of the writing operation, whether a distance between (i) a read pointer indicative of a current reading position in the frame memory and (ii) a write pointer indicative of a current writing position in the frame memory is less than a predetermined threshold; and a line reading control section for, in a case where the determination section determines that the distance between the read pointer and the write pointer is less than the predetermined threshold, carrying out a suspending operation of a line of the data which line is next to a line that has already been read, until the distance between the read pointer and the write pointer is not less than the predetermined threshold.

Advantageous Effects of Invention

With one aspect of the present invention, it is possible to avoid drop frame, reduce wasteful power consumption, and prevent tearing.

For a fuller understanding of the nature and advantages of the invention, reference should be made to the ensuing detailed description taken in conjunction with the accompanying drawings.

DESCRIPTION OF EMBODIMENTS

The following description will discuss an embodiment of the present invention with reference to FIGS. 1 through 6. Descriptions of configurations other than configurations described in specific items below can be omitted according to need. In a case where such configurations are described in other items, the configurations thus omitted are the same as those described in the other items. For convenience, members having the same functions as those described in items are given the same reference signs and their descriptions are omitted appropriately.

[Image Transfer System 1]

Figure 1:
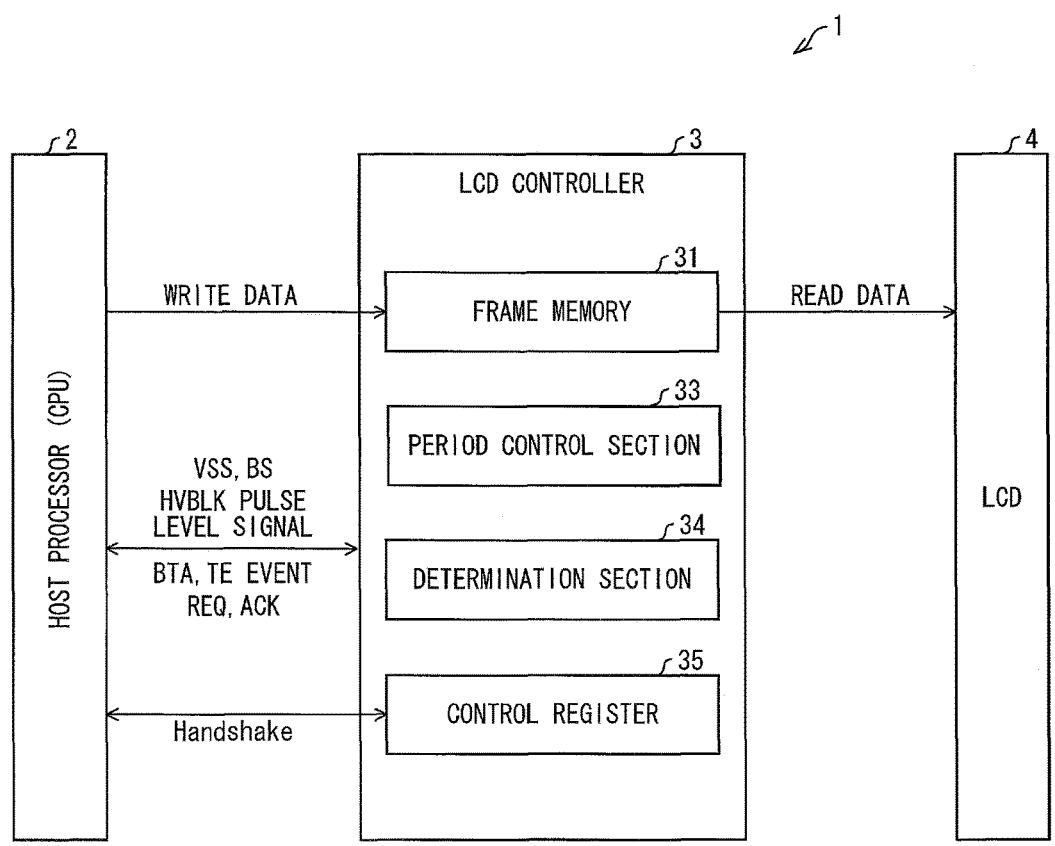
FIG. 1 is a block diagram illustrating an embodiment of a memory control device of the present invention.

Firstly, with reference to FIG. 1, a description will be discussed below as to an image transfer system 1 in accordance with an embodiment of the present invention. FIG. 1 is a block diagram illustrating a configuration of the image transfer system 1.

As illustrated in FIG. 1, the image transfer system 1 includes a host processor (host, memory control device) 2, an LCD controller (memory control device) 3, and an LCD (display control section) 4. The image transfer system 1 in accordance with the present embodiment is a device which carries out (i) a writing operation in which image data (data) transferred from the host processor 2 is written in a frame memory 31 (later described) and (ii) a reading operation in which image data is read out from the frame memory 31 so as to transfer the image data thus read out to the LCD 4. Note that, in the specification, a configuration, in which the LCD 4 (and/or host processor 2) is removed from the image transfer system 1, corresponds to a memory control device in accordance with one embodiment of the present invention.

(Host Processor 2)

The host processor 2 is a host processor (CPU; Central Processing Unit) for a device body (e.g. mobile terminal 10 illustrated in FIG. 2). The host processor 2 carries out an overall control (process) of the device body, and transfers, to the LCD controller 3, (i) image data to be transferred to the LCD 4, (ii) various signals such as a REQ (Request) signal, (iii) various control commands such as a handshake flag and BTA (Bus Turnaround; bus occupancy right), and (iv) packets such as a VSS (Vertical Sync Start) packet and a BS (Blanking Start) packet.

(LCD Controller 3)

The LCD controller 3 has a mechanism for inputting and outputting image data, and carries out processes such as an (i) operation in which image data transferred from the host processor 2 is written in the frame memory 31, and (ii) an operation in which image data is read out from the frame memory 31 so as to transfer the image data thus read out to the LCD 4.

As illustrated in FIG. 1, the LCD controller 3 includes at least the frame memory 31, a period control section (line reading control section) 33, a determination section 34, and a control register 35.

(Frame Memory 31)

The frame memory 31 is an image memory capable of storing at least image data corresponding to one (1) frame transferred from the host processor 2.

(Period Control Section 33)

The period control section 33 carries out a control in which a front porch period (horizontal front porch period) of a horizontal sync signal (Hsync) is extended so that a reading operation of a line of image data which line is next to a line which has already been read out is suspended. Note that the horizontal sync signal triggers start of a reading operation of each line of the image data. To be more specific, in a case of extending the front porch period, a time to start the reading operation of the next line can be delayed by a time period in which the front porch period is extended. That is, the reading operation of the next line can be suspended by the time period in which the front porch period is extended. Note here that a "horizontal front porch period" used herein indicates a time period from start of a horizontal blanking interval to start of a horizontal sync signal.

Furthermore, in a case where the determination section 34 determines that a distance between (i) a read pointer (hereinafter merely referred to as "rp") and (ii) a write pointer (hereinafter merely referred to as "wp") is less than "RDIST (predetermined threshold)," the period control section 33 suspends, until the distance between rp and wp becomes not less than "RDIST," the reading operation of a line of image data which line is next to a line that has already been read out (hereinafter merely referred to as "suspending control"). Note that (i) the read pointer is indicative of a current position at which image data is read out in the frame memory 31 and (ii) the write pointer is indicative of a current position at which image data is written in the frame memory 31.

(Determination Section 34)

The determination section 34 determines whether or not the distance between rp and wp is less than "RDIST," in a case where a readout period Tout is shorter than a writing period Tin.

Note that it is preferable that the determination section 34 determines whether or not the distance between rp and wp is less than "RDIST" for every time point at which the reading operation of a line of image data is started. Consequently, no suspending control is carried out in the middle of reading out one (1) line of image data. It is therefore possible to avoid wasteful processes such as a process of reading again, from the beginning, a line which is in the middle of being read out.

(Control Register 35)

The control register 35 stores control commands supplied from the host processor 2 and transmits a control command stored in the control register 35 to the host processor 2. Examples of the control commands include various data used to, for example, set parameters in sections (circuit). Examples of the various data encompass specified values for calculating an image size, a line size, a frequency, a transfer waiting time, and a risky period. Examples of the control command which the control register 35 supplies to or receives from the host processor 2 encompass a handshake flag.

(Handshake Flag)

When the host processor 2 transfers image data, the host processor 2 changes a handshake flag of the control register 35 from "0" to "1," and then transmits request information to the LCD controller 3. Upon receipt of the request information, the LCD controller 3 changes, when the host processor 2 is ready to transmit data, the handshake flag of the control register 35 from "1" to "0," and then transmits permission information to the host processor 2. After transmitting the request information, the host processor 2 monitors the handshake flag of the control register 35 by polling. When recognizing reception of the permission information, the host processor 2 starts to transfer image data to the LCD controller 3. It is possible to delay a time point to start a writing operation (time point to start DSI (Display Serial Interface) input), normally by adjusting a time period from a time point when the handshake flag is changed to "1" to a time point when the handshake flag is changed to "0."

(LCD 4)

The LCD 4 displays image data transferred from the host processor 2 via the LCD controller 3.

The LCD 4 in accordance with the present embodiment is preferably a liquid crystal panel using a semiconductor oxide (hereinafter referred to as "semiconductor oxide liquid crystal panel." An example of the oxide is an oxide including indium, gallium, and zinc).

[Characteristic Operation of Image Transfer System 1]

The following description will discuss details of a suspending control which is a characteristic operation of the image transfer system 1.

Figure 3:
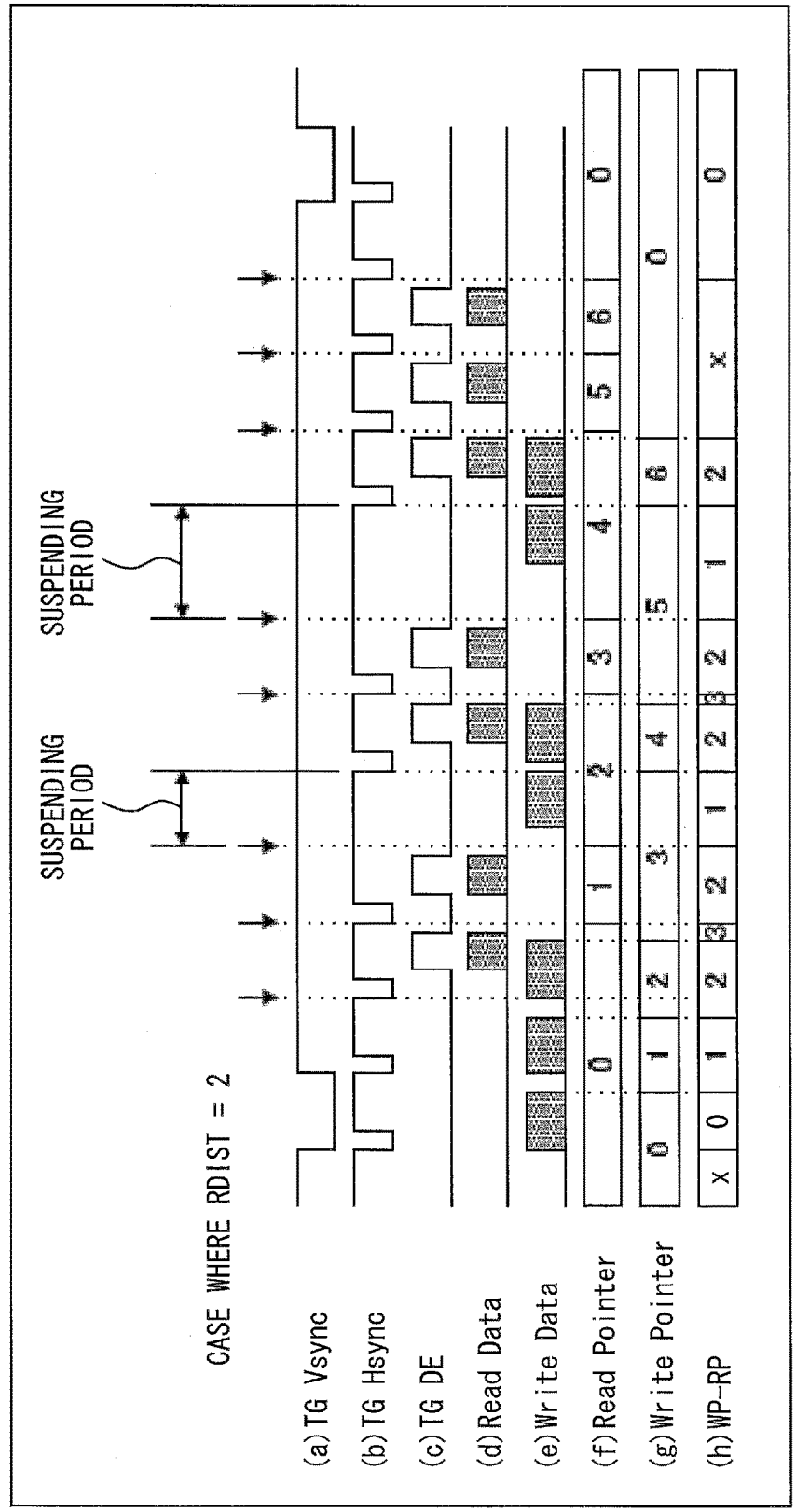
FIG. 3 is a timing chart illustrating an example of a characteristic operation (suspending control) of the memory control device.

FIG. 3 is a timing chart illustrating an example of a characteristic operation (suspending control) of the image transfer system 1.

(a) through (h) of FIG. 3 illustrate an output waveform of a vertical sync signal Vsync of a TG (Timing Generator), an output waveform of a horizontal sync signal Hsync of the TG, DE (Data Enable) of the TG, Read Data which is read out from the frame memory 31, Write Data which is supplied to the frame memory 31, rp (Read Pointer), wp (Write Pointer), and wp−rp (difference between wp and rp), respectively.

For convenience, FIG. 3 illustrates an example in which a total recording capacity of the frame memory 31 is, when expressed in the unit of the number of lines, 7 (lines 0 through 6). It should be noted that the actual total recording capacity of the frame memory 31 is a recording capacity corresponding to at least the total number of all lines of image data, and is overwhelmingly larger than the number of lines 7.

FIG. 3 illustrates a case where a predetermined threshold (distance) "RDIST" which is an index of the suspending control is set to "2."

In a case where wp−rp in (h) of FIG. 3 is less than "2(=RDIST)," i.e. "1", Read Data is not outputted and a reading operation is suspended as illustrated in (d) of FIG. 3. In other words, a time period meeting wp−rp=1<2 is a suspending period. During this time period, the period control section 33 extends (prolongs) a front porch period of the horizontal sync signal Hsync so as to suspend a reading operation of a line of image data which line is next to a line that has already been read out.

On the other hand, in a case where wp−rp illustrated in (h) of FIG. 3 is not less than "2(=RDIST)," i.e. "2" or "3", Read Data is outputted and a reading operation is conducted as illustrated in (d) of FIG. 3.

Note that the time period, represented by a sign "x" in (h) of FIG. 3, is a time period during which writing of image data corresponding to one (1) frame (one screen) has been completed and image data is not updated. During this time period, no suspending control is carried out, and Read Data is normally read out from the frame memory 31.

That is, the determination section 34 determines whether the current time is within a time period represented by the sign "x" in (h) of FIG. 3. In a case where the determination section 34 determines that the current time is within the time period represented by the sign "x", the period control section 33 does not carry out the suspending control.

Note that, in a state where no image data is updated (i.e. a state where it is unnecessary to rewrite image data recorded in the frame memory 31), no tearing will occur regardless of when a reading operation is started. In view of the circumstances, with the above arrangement, in a case where it is determined that no writing operation is conducted with respect to the frame memory 31 (the current time is within the period represented by "x"), no suspending control will be carried out. This causes the suspending control to be not carried out unnecessarily, and ultimately allows a reduction in wasteful power consumption.

Figure 4:
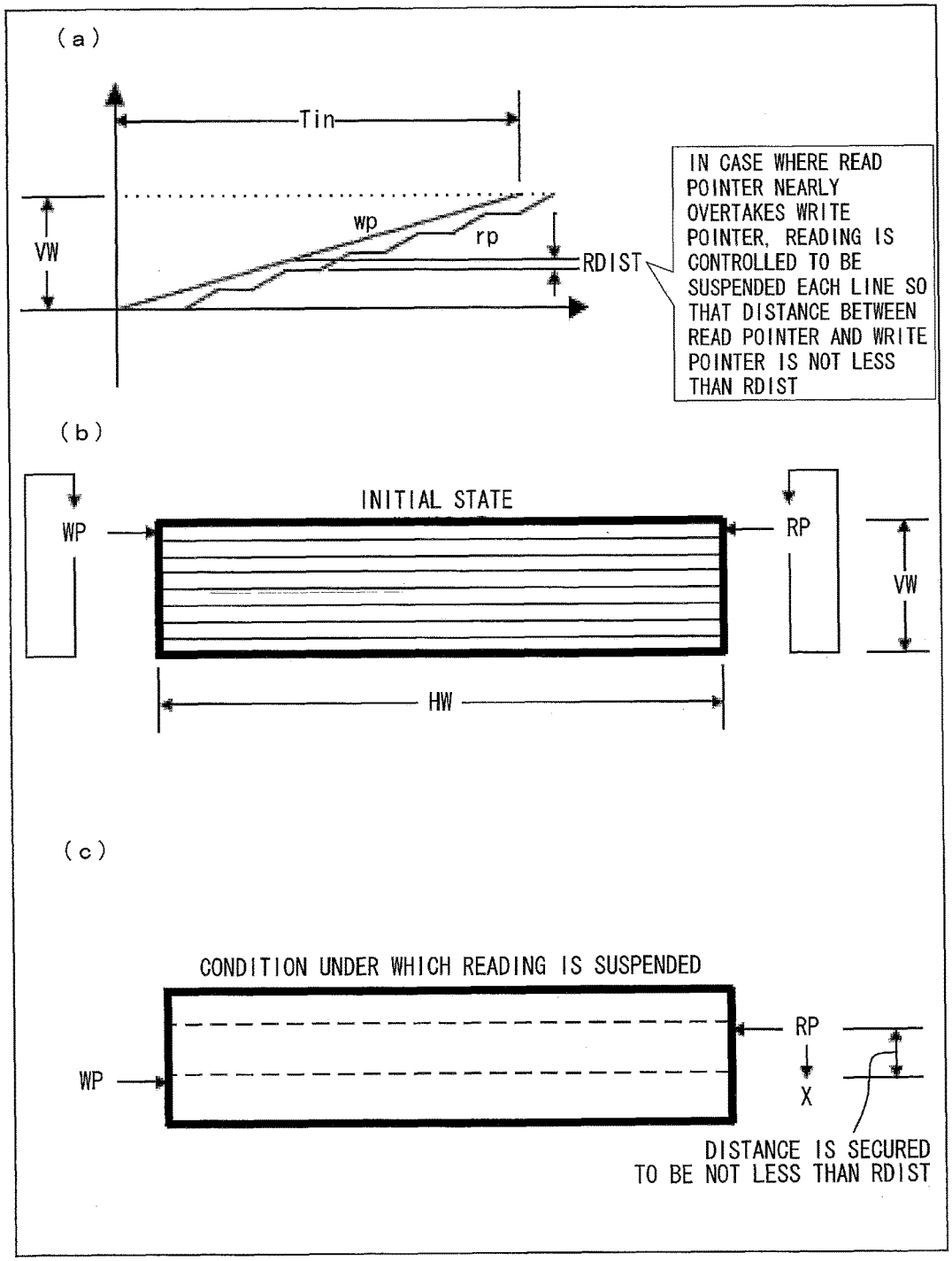
FIG. 4 is a drawing for explaining the suspending control. (a) of FIG. 4 illustrates how a read pointer (rp) and a write pointer (wp) change in the suspending control. (b) of FIG. 4 illustrates a state of a frame memory in an initial state. (c) of FIG. 4 illustrates a relation between a condition under which a reading operation is suspended and a distance between rp and wp.

FIG. 4 is another drawing for illustrating the suspending control. (a) of FIG. 4 illustrates how rp and wp change in the suspending control.

A lateral axis in (a) of FIG. 4 indicates a time, and a longitudinal axis indicates the number of lines of image data which lines are written in or read out from the frame memory 31. In the drawing, "VW" represents a width of a vertical sync interval (here, the number of all lines of image data recorded in the frame memory 31). Each graph in the drawing represents how rp and wp change with time.

The full line graph of rp in the drawing has an inclination in a case where the distance between rp and wp is not less than "RDIST," which indicates that the reading operation of image data (line) is continued. In contrast, in a case where the distance between rp and wp is less than "RDIST," the full line graph of rp has no inclination, which indicates that the reading operation of image data (a line of image data which line is next to a line that has already been read out) is suspended.

Next, a description will be discussed below, with reference to (b) and (c) of FIG. 4, as to a relation between the suspending control and a recording state of the frame memory 31. (b) of FIG. 4 conceptually illustrates a state of the frame memory 31 in an initial state. (c) of FIG. 4 conceptually illustrates a relation between (i) a condition under which the reading operation is suspended and (ii) a distance between rp and wp. In the drawing, "HW" represents a width of a horizontal sync interval (corresponding to a recording capacity of one (1) line of image data recorded in the frame memory 31).

As illustrated in (c) of FIG. 4, in a case where the distance between rp and wp is secured to be not less than "RDIST," it is unnecessary to suspend the reading operation. On the other hand, in a case where the distance between rp and wp is less than "RDIST," it is necessary to suspend the reading operation in order to avoid tearing.

Note that it is possible to employ, as the unit of the "distance between rp and wp", the unit of recording capacity of the frame memory 31 or the unit correlated with the unit of the recording capacity. Examples of the unit of the recording capacity encompass "byte" or "bit." Examples of the unit correlated with the unit of the recording capacity encompass the number of lines of image data which lines are to be written in the frame memory 31.

In a case where "RDIST" is expressed in the unit of recording capacity, "RDIST" can be expressed in bytes or bits corresponding to at least one (1) line of image data. In a case where "RDIST" is expressed in the unit of the number of lines, "RDIST" can be expressed in at least one (1) line. For example, in a case where image data is processed while reading n lines (n is a natural number) simultaneously, "RDIST" can be set to n. The present embodiment is configured so that the LCD controller 3 reads lines of image data one by one, and is illustrated by an example where "RDIST"=2.

Note that the unit of "RDIST" and the unit of the "distance between rp and wp" are preferably identical to each other, but are not necessarily identical to each other. In the present specification, for convenience, it is assumed that (i) in a case where the above two units are different from each other, one of the two units can be converted into the other and (ii) such conversion is made as needed. In this case, it is further assumed that, in a case where (i) the determination section 34 makes a determination and (ii) the unit of "RDIST" and the unit of the "distance between rp and wp" are different from each other, the determination section 34 converts one of the two units into the other.

(Whole Flow of Suspending Control)

Figure 5:
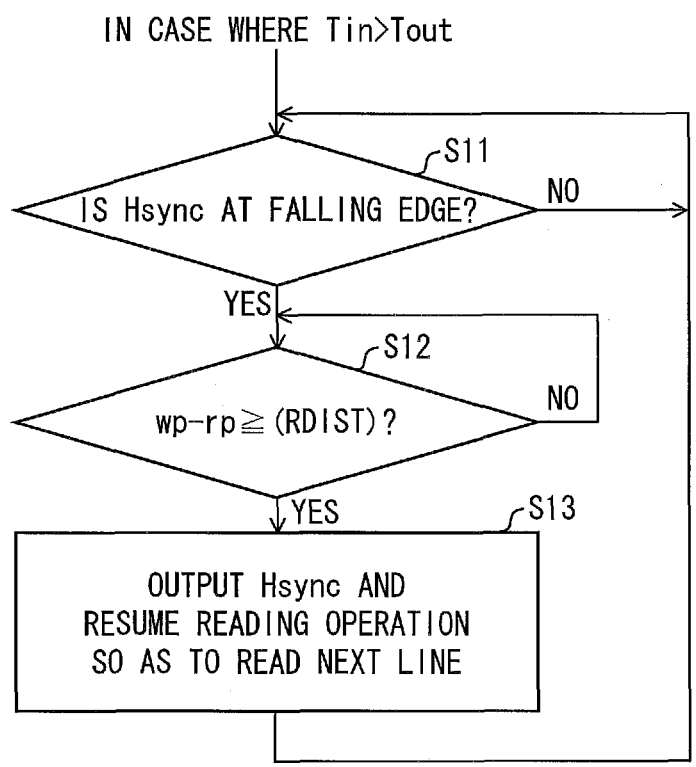
FIG. 5 is a flowchart illustrating an example of a characteristic operation of the memory control device in a case where Tin>Tout.

Next, with reference to FIG. 5, a description will be discussed below as to a whole flow of a suspending control which is carried out in a case where the writing period Tin>the readout period Tout. FIG. 5 is a flowchart illustrating the operation of the image transfer system 1 and an example of a suspending control which is carried out in a case where Tin>Tout.

In the step S11 (hereinafter "step" will be omitted) illustrated in FIG. 5, the determination section 34 determines (specifies) whether or not the horizontal sync signal Hsync is at a falling edge. In a case where it is determined that the horizontal sync signal Hsync is at a falling edge, the process proceeds to S12 (YES). On the other hand, in a case where it is determined that the horizontal sync signal Hsync is not at a falling edge, the process stays in S11 (NO).

In S12, the determination section 34 determines (specifies) whether wp−rp≥(RDIST=2). In a case where wp−rp≥ (RDIST=2), the process proceeds to S13 (YES). Otherwise, the process stays in S12, which causes a suspending state (NO). This causes output of the horizontal sync signal Hsync to be delayed, and ultimately causes the horizontal front porch period to be extended.

In S13, the LCD controller 3 outputs the horizontal sync signal Hsync, and resumes the reading operation of image data with respect to the frame memory 31 so as to read out a line of the image data which line is next to the aforementioned line, and the process returns to S11 at a time when readout of the next line is completed.

(Variation of Whole Flow of Suspending Control)

Next, with reference to FIG. 6, a description will be discussed below as to a variation of the whole flow of the suspending control illustrated in FIG. 5.

Figure 6:
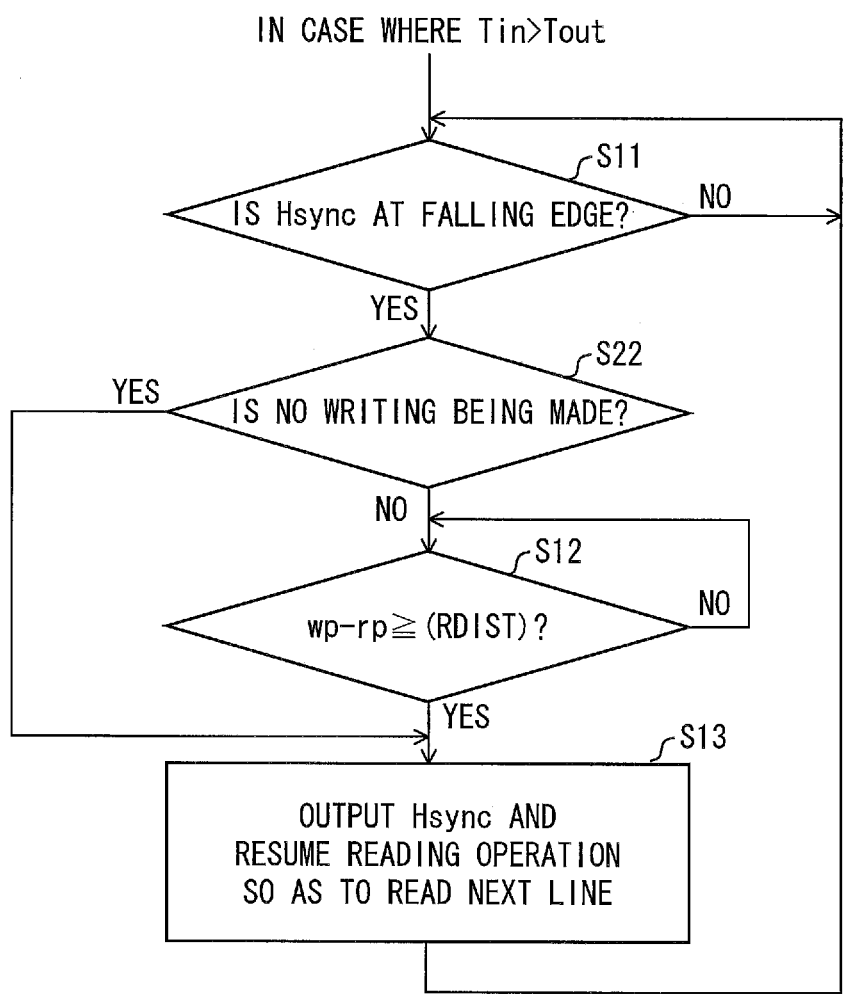
FIG. 6 is a flowchart illustrating another example of a characteristic operation of the memory control device in a case where Tin>Tout.

Note that the flow illustrated in FIG. 6 is different from the whole flow of the suspending control illustrated in FIG. 5 in that S22 is added between S11 and S12 in the flow illustrated in FIG. 5. Note, however, that processes in steps other than S22 are the same as those in the flow illustrated in FIG. 5, and therefore their descriptions are omitted here.

In S22, the determination section 34 determines (specifies) whether the current time is within a time period represented by the sign "x" in (h) of FIG. 3 (whether writing is not being carried out, writing operation is not started, or image data is not updated). In a case where it is determined that the current time is not within the period represented by the sign "x" in (h) of FIG. 3 (in a case where writing operation is started, i.e. image data is updated), the process proceeds to S12 (NO). On the other hand, in a case where the current time is within the period represented by the sign "x" in (h) of FIG. 3 (image data is not updated), the process proceeds to S13 (YES).

Note that, in a state where image data is not updated (i.e. in a state where it is unnecessary to rewrite image data recorded in the frame memory 31), no tearing occurs regardless of when the reading operation is started. Accordingly, in the aforementioned flow, in a case where the writing operation is not conducted on the frame memory 31 (the writing operation is not yet started or already ended), no suspending control is carried out. This causes the suspending control to be not carried out unnecessarily. This ultimately allows a reduction in wasteful power consumption.

(Effect of Image Transfer System 1)

According to the image transfer system 1 in accordance with the present embodiment, readout of the next line is suspended in a case where the distance between rp and wp is less than "RDIST," whereas the readout of the next line is resumed in a case where the distance between rp and wp is not less than "RDIST." This controls rp and wp in such a manner that rp does not overtake wp, and this ultimately allows tearing not to occur (suspending control).

According to the above suspending control, the reading operation of image data is suspended for each line of one (1) frame. Accordingly, even if the frame memory has recording capacity of only one (1) frame (one screen), the host processor 2 can conduct a writing operation at any time instead of being required to wait at all.

Since the host processor 2 is not required to wait, it is possible to suppress judder, prevent a frame from being dropped, and prolong a time period for the host processor 2 to be idle. This allows a reduction in power consumption as a whole.

With the above configuration, it is possible to avoid frame from being dropped, reduce wasteful power consumption, and prevent tearing.

The above suspending control also brings about the following secondary effect: in a case where image data is processed while simultaneously reading out a plurality of lines, such as in an expansion filter process, appropriate setting of "RDIST" allows the reading operation to be conducted in a state where image data to be read has been already present in the frame memory 31. For example, in a case of processing image data while simultaneously reading n lines (n is a natural number), the "RDIST" can be set to n.

Furthermore, in a case where the extension of the front porch period of the horizontal sync signal Hsync causes update of image data and driving of the LCD 4 to overlap each other, the cycle of the horizontal sync signal Hsync becomes uneven. However, the driving method of the present invention is suitable for, for example, a liquid crystal panel employing a semiconductor oxide (hereinafter referred to as "semiconductor oxide liquid crystal panel") in which a driving cycle is automatically delayed by carrying out drive for several frames after updating of image data.

[Mobile Terminal 10]

Figure 2:
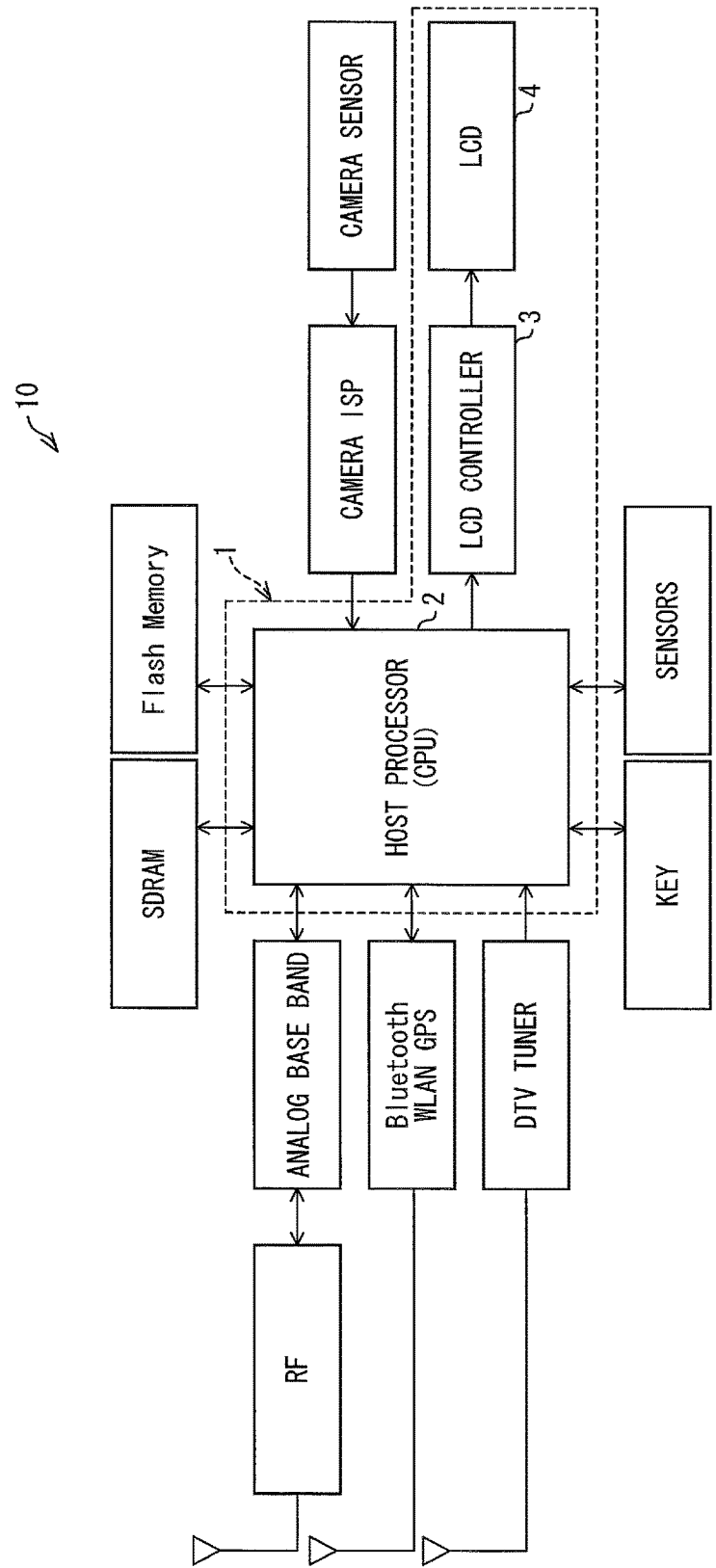
FIG. 2 is a block diagram illustrating an embodiment of a mobile terminal of the present invention (including the memory control device).

Next, with reference to FIG. 2, a description will be discussed below as to the mobile terminal 10 which is another embodiment of the present invention. FIG. 2 is a block diagram illustrating a whole configuration of the mobile terminal 10 including the image transfer system 1.

As illustrated in FIG. 2, the mobile terminal 10 includes, in addition to the image transfer system 1, an SDRAM, a flash memory, a camera sensor, a camera ISP, RF, an analog base band, Bluetooth©, WLAN, GPS (Global Positioning System), a DTV tuner, keys, sensors etc. Note, however, that components, other than the image transfer system 1, are not closely related to an essence of the present invention and so their descriptions are omitted here.

(Effect of Mobile Terminal 10)

Since the mobile terminal 10 in accordance with the present embodiment includes the image transfer system 1, it is possible to realize a mobile terminal capable of avoiding frame from being dropped, reducing wasteful power consumption such as power consumed in a waiting time of the host processor 2, and preventing tearing. Other effects of the mobile terminal 10 are the same as those described in the above item titled (Effect of image transfer system 1) and so their descriptions are omitted here.

[Another Expression of the Present Invention]

The present invention can be also expressed as follows. Specifically, in the suspending control of the present invention, in a case where rp starts later than wp, it is preferable that a difference between wp and rp at a time when readout of each line is to be started is calculated and when the difference is less than a predetermined "distance (RDIST)", the reading operation is suspended, so that a front porch period of the horizontal sync signal Hsync is prolonged. Furthermore, it is preferable that in a case where the difference between wp and rp becomes not less than the "distance (RDIST)", the reading operation is resumed and a process on the next line is performed. The present invention may be arranged such that after the host has written a predetermined number of effective lines, the reading operation is not stopped (no suspending control is performed). The present invention may be arranged such that in a case where writing by the host is not performed (in a case where there is no update of an image by the host), no operation to stop reading is performed (no suspending control is performed).

Consequently, in a case where writing is slow in rate than reading, even if the frame buffer has recording capacity corresponding to one screen, the host can write anytime without being required to wait at all, and tearing does not occur at all.

Furthermore, since the host is not required to wait, it is possible to suppress judder, prevent drop frame, and prolong a time for the host processor to be idle, thereby reducing power consumption as a whole.

In the present invention, when update of an image and driving of liquid crystal overlap each other, the cycle of the horizontal sync signal Hsync becomes uneven. However, the driving method of the present invention is suitable for a semiconductor oxide liquid crystal panel in which a driving cycle is automatically delayed by carrying out drive for several frames after updating of an image.

Furthermore, in a case where image data is processed while simultaneously reading a plurality of lines, such as in an expansion filter process, setting the distance allows the operation to be conducted in a state where data to be read has been already present in the frame buffer.

SUMMARY

A memory control device (LCD controller 3) in accordance with one aspect of the present invention is preferably a memory control device which conducts (i) a writing operation in which data transferred from a host (host processor 2) is written in a frame memory and (ii) a reading operation in which the data is read out from the frame memory so as to transfer the data to a display control section (LCD 4), the memory control device comprising: a determination section (determination section 34) for determining, in a case where a readout period (Tout) from start of the reading operation to end of the reading operation is shorter than a writing period (Tin) from start of the writing operation to end of the writing operation, whether a distance between (i) a read pointer (rp) indicative of a current reading position in the frame memory and (ii) a write pointer (wp) indicative of a current writing position in the frame memory is less than a predetermined threshold (RDIST); and a line reading control section (period control section 33) for, in a case where the determination section determines that the distance between the read pointer and the write pointer is less than the predetermined threshold, carrying out a suspending operation of a line of the data which line is next to a line that has already been read, until the distance between the read pointer and the write pointer is not less than the predetermined threshold.

With the arrangement, in a case where an operation rate of the reading operation is higher than an operation rate of the writing operation, when it is determined that the distance between the read pointer (hereinafter merely referred to as "rp") indicative of a current reading position in the frame memory and the write pointer (hereinafter merely referred to as "wp") indicative of a current writing position in the frame memory is less than the predetermined threshold, the line reading control section carries out a suspending control of a line of the data which line is next to a line that has already been read (hereinafter merely referred to as "suspending control"), until the distance between rp and wp is not less than the predetermined threshold.

To be more specific, when the distance between rp and wp is less than the predetermined threshold, the reading operation of a line of the data which line is next to a line that has already been read is suspended. On the other hand, when the distance between rp and wp is not less than the predetermined threshold, the reading operation of the next line is started. This allows controlling rp and wp in such a manner that rp does not overtake wp, so that tearing does not occur.

Furthermore, since the reading operation of data is suspended with respect to each line of one frame, the host can carry out the writing operation without being required to wait at all, even if the frame memory has recording capacity of only one frame (one screen).

Furthermore, since the host is not required to wait, it is possible to suppress judder, prevent drop frame, and prolong a time for the host to be idle, thereby reducing power consumption as a whole.

With the above configuration, it is possible to avoid drop frame, reduce wasteful power consumption, and prevent tearing.

Furthermore, the memory control device of the present invention also brings about the following secondary effect: in a case where image data is processed while simultaneously reading a plurality of lines, such as in an expansion filter process, appropriate setting of the predetermined threshold appropriately allows the reading operation to be conducted in a state where data to be read has been already present in the frame memory.

Note that it is possible to employ, as the unit of the "distance between rp and wp", the unit of recording capacity of the frame memory or the unit correlated with the unit of the recording capacity. Examples of the unit of the recording capacity encompass "byte" or "bit". Examples of the unit correlated with the unit of the recording capacity encompass the number of lines of the data which lines are to be written in the frame memory.

Furthermore, in a case where the "predetermined threshold" is expressed in the unit of recording capacity, the "predetermined threshold" can be expressed, for example, in bytes or bits corresponding to at least one (1) line of the data. On the other hand, in a case where the "predetermined threshold" is expressed in the unit of the number of lines, the "predetermined threshold" can be expressed, for example, in at least one (1) line.

The unit of "predetermined threshold" and the unit of the "distance between rp and wp" are preferably identical to each other, but are not necessarily identical to each other. In the present specification, for convenience, it is assumed that (i) in a case where these units are different from each other, one of the two units can be converted into the other, and (ii) such conversion is made as needed.

The memory control device in accordance with one aspect of the present invention may be arranged such that the line reading control section carries out the suspending control by extending a front porch period of a horizontal sync signal which triggers start of a reading operation of each line of the data.

With the arrangement, when extension of the front porch period causes update of data and driving of the display control section to overlap each other, the cycle of the horizontal sync signal becomes uneven. However, the driving method of the present invention is suitable for, for example, a liquid crystal panel employing a semiconductor oxide (hereinafter referred to as "semiconductor oxide liquid crystal panel") in which a driving cycle is automatically delayed by carrying out drive for several frames after updating of data.

The memory control device in accordance with one aspect of the present invention may be arranged such that the determination section determines, each time when the reading operation of a line of the data is started, whether or not the distance between the read pointer and the write pointer is less than the predetermined threshold.

With the arrangement, the determination process is carried out each time when the reading operation of a line of the data is started. Consequently, no suspending control is carried out in the middle of reading out of one (1) line of data. It is therefore possible to avoid wasteful processes such as a process of reading again, from the beginning, a line which is in the middle of being read out.

It is preferable to arrange the memory control device in accordance with one aspect of the present invention such that the determination section further determines whether or not the writing operation is carried out with respect to the frame memory, and the line reading control section does not carry out the suspending control when the determination section determines that the writing operation is not carried out with respect to the frame memory.

Note that, in a state where no data is updated (i.e. a state where it is unnecessary to rewrite data recorded in the frame memory), no tearing will occur regardless of when the reading operation is started. In view of the circumstances, with the arrangement, in a case where it is determined that no writing operation is conducted with respect to the frame memory, no suspending control will be carried out. This causes the suspending control to be not carried out unnecessarily, and ultimately allows a reduction in wasteful power consumption.

A mobile terminal in accordance with one aspect of the present invention preferably includes one of the aforementioned memory control devices.

With the arrangement, it is possible to realize a mobile terminal capable of avoiding drop frame, reducing wasteful power consumption, and preventing tearing.

[Additional Matter]

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a new technical feature can be formed by combining technical means disclosed in different embodiments.

[Software Implementation Example]

Lastly, blocks of the image transfer system 1, blocks of the LCD controller 3 in particular, may be realized by a logic circuit (hardware) provided in an integrated circuit (IC chip) or may be realized by software as executed by a CPU (Central Processing Unit).

In the latter case, the image transfer system 1 includes: a CPU that executes instructions of a program that is software realizing the foregoing functions (e.g. memory control program); ROM (Read Only Memory); RAM (Random Access Memory) that develops the program; and a storage device (storage medium) storing the program and various kinds of data. The object of the present invention can be realized in such a manner that the image transfer system 1 is provided with a computer-readable storage medium for storing program codes (such as executable program, intermediate code program, and source program) of programs of the image transfer system 1 which programs serve as software for realizing the functions, and a computer (alternatively, CPU or MPU) reads out and executes the program codes stored in the storage medium. The storage medium is a non-transitory tangible medium which is, for example, tapes such as a magnetic tape and a cassette tape, or discs such as magnetic discs (e.g. a floppy disc® and a hard disc), and optical discs (e.g. CD-ROM, MO, MD, DVD, and CD-R), or cards such as an IC card (including a memory card) and an optical card, or semiconductor memories such as mask ROM, EPROM, EEPROM®, and flash ROM, or logic circuits such as PLD (Programmable logic device) and FPGA (Field Programmable Gate Array).

Further, the image transfer system 1 may be arranged so as to be connectable to a communication network so that the program code is supplied to the image transfer system 1 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL (Asymmetric Digital Subscriber Line) and (ii) wireless connections such as IrDA and remote control using infrared ray, Bluetooth®, IEEE 802.11, HDR (High Data Rate), NFC (Near Field Communication), DLNA (Digital Living Network Alliance)®, mobile phone network, satellite connections, and terrestrial digital network. Note that the present invention can be also realized by the program codes in the form of a computer data signal embedded in a carrier wave, which is the program that is electrically transmitted.

INDUSTRIAL APPLICABILITY

The present invention is applicable to a memory control device etc. which carries out an operation of writing, in a frame memory, data transferred from a host processor and an operation of reading the data written in the frame memory and transferring the data to a display panel.

REFERENCE SIGNS LIST

1 Image transfer system
2 Host processor (host)
3 LCD controller (memory control device)
4 LCD (display control section)
10 Mobile terminal
31 Frame memory
33 Period control section (line reading control section)
34 Determination section (determination section)
Tin Writing period
Tout Readout period

The invention claimed is:

1. A memory control device which conducts (i) a writing operation in which data transferred from a host is written in a frame memory and (ii) a reading operation in which the data is read out from the frame memory so as to transfer the data to display control circuitry, the memory control device comprising:
   determination circuitry that determines, in a case where a readout period from start of the reading operation to end of the reading operation is shorter than a writing period from start of the writing operation to end of the writing operation, whether a distance between (i) a read pointer indicative of a current reading position in the frame memory and (ii) a write pointer indicative of a current writing position in the frame memory is less than a predetermined threshold; and
   line reading control circuitry that, in a case where the determination circuitry determines that the distance between the read pointer and the write pointer is less than the predetermined threshold, carries out a suspending control of reading out a line of the data which line is next to a line that has already been read, until the distance between the read pointer and the write pointer is not less than the predetermined threshold; wherein
   the frame memory is a single memory which stores image data corresponding to one frame, and
   the line reading control circuitry carries out the suspending control by extending a front porch period of a horizontal sync signal which triggers start of a reading operation of each line of the data.

2. The memory control device as set forth in claim 1, wherein the determination circuitry determines, each time the reading operation of a line of the data is started, whether or not the distance between the read pointer and the write pointer is less than the predetermined threshold.

3. The memory control device as set forth in claim 1, wherein
   the determination circuitry further determines whether or not the writing operation is carried out with respect to the frame memory, and
   the line reading control circuitry does not carry out the suspending control when the determination circuitry determines that the writing operation is not carried out with respect to the frame memory.

4. A mobile terminal, comprising a memory control device as set forth in claim 1.

5. A non-transitory computer-readable recording medium, in which a memory control program for causing a computer to function as a memory control device as set forth in claim 1 is recorded, the memory control program causing the computer to function as each of the circuitry of the memory control device.

* * * * *